W. N. FURTHMANN.
TRANSFORMER COIL.
APPLICATION FILED OCT. 8, 1919.

1,359,589. Patented Nov. 23, 1920.

Witness:
Geo. C. Harrison

Inventor
William N. Furthmann
By Pond & Wilson,
Attys.

UNITED STATES PATENT OFFICE.

WILLIAM N. FURTHMANN, OF CHICAGO, ILLINOIS, ASSIGNOR TO GRAY-HEATH COMPANY, OF CHICAGO, ILLINOIS, A CORPORATION OF ILLINOIS.

TRANSFORMER-COIL.

1,359,589.  Specification of Letters Patent.   Patented Nov. 23, 1920.

Application filed October 8, 1919. Serial No. 329,386.

*To all whom it may concern:*

Be it known that I, WILLIAM N. FURTHMANN, a citizen of the United States, residing in Chicago, in the county of Cook and State of Illinois, have invented certain new and useful Improvements in Transformer-Coils, of which the following is a specification.

This invention relates to transformer or induction coils, such as are commonly used in motor vehicle equipment for intensifying the battery current for sparking purposes.

These coils usually take the form of cells of insulating material, within which are contained the usual primary and secondary windings, the condenser and the insulating compound; and in order to securely mount the cell in place it is provided with a bar riveted to the base of the cell and itself provided with holes by which it is secured on, and in some cases, grounded to the frame of the motor.

Owing to the fact that after the cell is loaded the insulating compound is poured into the cell in a very hot condition, it is impractical to solder the terminals of the windings to their leads within the cell itself, since the hot insulating compound melts the solder and breaks the connection. Hence, it has heretofore been the practice to drill holes in the walls of the cell, carry the winding terminals through said holes, and then solder them to the ground bar, or other external leads. This practice has one serious objection, which lies in the frequency and ease with which, when the cell is being mounted in place, the solder becomes knocked off, or else subsequently wears off, and thus breaks the connection, destroying the usefulness of the entire cell.

The principal object of the present invention is to improve transformer coils or cells of this character in the above noted respect, and produce a coil wherein it shall be impossible to break the circuits at any of the circuit terminals from external accident or wear.

In the accompanying drawing I have illustrated one practical form in which the invention may be embodied, and referring thereto—

Figure 1:
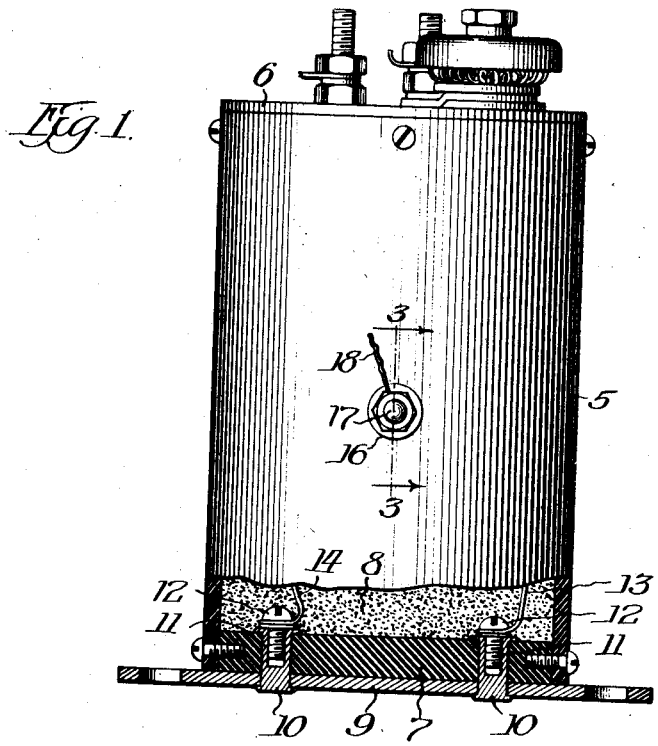
Figure 1 is a side elevation of a transformer coil, in vertical section through its lower end.
Figure 2:
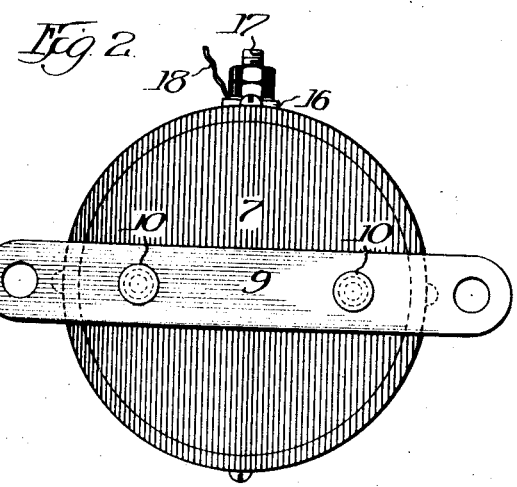
Fig. 2 is a bottom plan view of Fig. 1.
Figure 3:
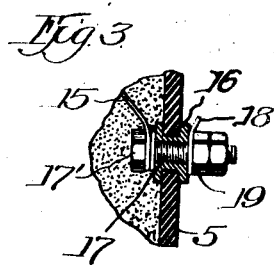

And Fig. 3 is a detail view in vertical section on line 3—3 of Fig. 1.

Referring to the drawing, 5 designates the cylindrical wall, 6 the top wall, and 7 the bottom wall of an ordinary coil holder or cell, made of bakelite or other suitable material. Within the cell are the usual primary and secondary windings, condenser, and insulating compound, a portion of which latter is shown at 8 in Fig. 1.

9 designates a flat metal strip commonly known as a ground bar that is secured to and across the bottom wall 7 by rivets 10. In accordance with my present invention, the inner ends of the rivets 10 are tapped as indicated at 11, to receive binding screws 12 by which any of the circuit terminals within the cell, such as the primary and secondary winding terminals 13 and 14 are conductively connected to the rivets 10 and, through the latter, to the ground bar 9. It will be observed that these mechanical connections form a reliable connection of the circuit terminals to the ground bar which is not affected by the heat of the insulating compound when poured in, nor is it subject to the liability of breakage or separation through accident or wear.

The same principle may be employed in connection with the other leads which pass through a wall of the cell. For instance, in Fig. 3, I show a lead for the other terminal 15 of the secondary winding, consisting of a hollow metal internally threaded flanged sleeve or rivet 16 set in an aperture in the wall 5, and a binding screw 17 threaded through said sleeve or rivet; the head 17' of the screw clamping the terminal 15 against the inner flange of the sleeve 16, and the external conductor wire 18 being clamped between the outer flange of the sleeve 16 and a binding nut 19. Such a construction as that last described obviously affords a reliable electrical connection between the inside and outside of the cell, without having to depend upon a soldered connection which, as previously stated, is liable to be broken by melting if on the inside and by accidental knocking or abrasion if on the outside.

I claim:

1. In a transformer coil, the combination with a cell of insulating material containing wire terminals of a circuit, of an electrical conducting bar, a fastening element of electrically conductive material securing said bar to said cell and extending within the latter, and means for attaching a wire terminal to a portion of said fastening element within said cell.

2. In a transformer coil, the combination with a cell of insulating material containing wire terminals of a circuit, of an electrical conducting bar, a pair of rivets by which said bar is secured to a wall of said cell and mechanical attaching means for fastening wire terminals of the circuit to the inner ends of said rivets.

3. In a transformer coil, the combination with a cell of insulating material containing wire terminals of a circuit, of an electrical conducting bar, a pair of rivets by which said bar is secured to a wall of said cell, said rivets being tapped at their inner ends, and binding screws coöperating with the tapped inner ends of said rivets to connect wire terminals of said circuit to the latter.

4. In a transformer coil, the combination with a cell of insulating material containing wire terminals of a circuit, of a ground bar, a pair of rivets passed through said ground bar and the bottom wall of said cell, said rivets being tapped at their inner ends, and binding screws coöperating with the tapped inner ends of said rivets to connect wire terminals of said circuit to the latter.

WILLIAM N. FURTHMANN.